SIGNAL TRANSLATION SYSTEM

Filed April 15, 1964 5 Sheets-Sheet 1

WITNESSES:
John G. Chopp
James G. Young

INVENTOR
Irving I. Kaplan and
Joseph G. Fay
BY Ernest P. Klipfel
ATTORNEY

Oct. 3, 1967 I. I. KAPLAN ETAL 3,345,572

SIGNAL TRANSLATION SYSTEM

Filed April 15, 1964 5 Sheets-Sheet 3

Oct. 3, 1967 I. I. KAPLAN ETAL 3,345,572

SIGNAL TRANSLATION SYSTEM

Filed April 15, 1964

5 Sheets-Sheet 5

United States Patent Office 3,345,572
Patented Oct. 3, 1967

3,345,572
SIGNAL TRANSLATION SYSTEM
Irving I. Kaplan and Joseph G. Fay, Baltimore, Md., assignors to Westinghouse Electric Corporation, East Pittsburgh, Pa., a corporation of Pennsylvania
Filed Apr. 15, 1964, Ser. No. 360,050
4 Claims. (Cl. 325—474)

This invention relates to a signal translation system and more particularly to improvements in a signal translation system for retrieving information signal data dispersed in a wide spectrum of signal frequencies including noise frequencies and other frequencies of random phase and amplitude.

The invention is illustrated in connection with a system for retrieving pulse Doppler radar signal data from the Doppler echo spectrum of a radar receiver and for increasing the signal to noise ratio. However, the invention is not so limited. Its adaptability to other signal translation systems will be apparent to those skilled in the art.

A novel aspect of the invention resides in the use, in a signal translation system, of magnetic cores having a plurality of reversible stable magnetic states between two stable saturation limits in a special circuit configuration which permits the core to serve as a demodulator, integrator, storage, or memory element and a switch device in a special interrogation matrix. In this environment the demodulation function is sometimes referred to an envelope detection and the integration of the detected signal is sometimes referred to as post-detection integration.

As previously mentioned, the invention is applicable generally to any communication or spectral-analysis system but is particularly applicable where the desired signal data is spread over a wide spectrum, such as in an FM system, but for convenience the invention is described and illustrated as applied to a pulse Doppler radar system in connection with which the invention was developed. The pulse Doppler radar environment is chosen for illustrating the invention because it illustrates the "two-dimensional" aspect, namely, the "scooping-up" of the signal power from a band in the frequency spectrum. In this two-dimensional aspect the bandwidth of a signal channel becomes one-dimension and time becomes the other. In other words, the signal power is frequency quantized and time quantized. It is common to talk in terms of a single frequency, or line spectrum, but in fact signal intelligence is always distributed among a spectrum of frequencies represented by a bandwidth. The signal data is represented by a power spectrum which in the present system, is received, stored and read out into electrical signal storage and data processing means.

There are numerous systems in existence for the storage and handling of signal power spectra. Inuluded in the list of such systems are: electron tube circuits, electrostatic recording systems, and magnetic recording systems using magnetic materials having bistable characteristics. The static memory device of the present invention is of the latter type and in addition to serving as a memory device serves as a demodulator, and integrator.

In the coherent radar systems utilizing the Doppler frequency shift phenomena, the shift in frequency of the received signal spectrum is proportional to the radial velocity between the transmitting source and the target, and, if suitably measurable, will become a source of information about a particular target parameter, rate range, which is the same as radial velocity. It is customary for the volume of possible target parameters surveyed by a radar system to be quantized along radial and angular coordinates. The angular quantization is the function of the antenna, while quantization of the radial coordinate takes place within the confines of an individual angular quantum.

As is well known in the process of detecting signals in random noise, such as is introduced by all practical antennas and receivers, the process is materially aided by reducing the bandwidth through which the corrupted signal, that is, the received signal plus noise, passes before a detection decision is made. It has been found that a Doppler frequency shift of a radar echo signal is measurable to a satisfactory degree of resolution by using a large number of contiguous channels of selected bandwidth, collectively covering the band of frequencies having information-bearing significance. In effect, the continuum of frequencies is quantized such that the bandwidth of one of the frequency channels becomes one quantum. The center frequency of the channel filter then labels the center of the Doppler shifted frequency signal power spectrum. This frequency channelling coincides with the bandwidth reduction made necessary or desirable by the requirements of signal detection. In accordance with the illustrated embodiment of the present invention, pulse Doppler radar apparatus employs a receiver which includes a multi-channel system in which the Doppler frequency resolution is carried out by a bank of contiguous frequency filters. To examine the output an interrogation matrix is employed having a unit in each channel which performs the functions of pre-detection integration, demodulation of the envelope, post-detection integration, storage and serves as a switch point in the interrogation matrix. Sequential interrogation of the matrix is part of the basic signal data processing, the data organization process making use of the detection decisions which are binary two-state yes-no in nature, and according to established rules arranges this information into sets describing a particular target. The signal data information in the power spectrum output of the individual channels may be handled by conventional digital data handling equipment of conventional design.

In copending patent application Ser. No. 64,372, filed Oct. 24, 1960 now Patent No. 3,181,149 in the name of Norman L. Weinberg and Ralph J. Metz, for Signal Data Extraction Circuit and Method Employing Magnetic and Other Solid State Devices, owned by the assignee of this application, there is described and claimed a signal data retrieval system in which the novel improvement of this invention is well adapted to be utilized. In the system of that application a plurality of contiguous filter circuits utilizing a core-transistor circuit performs the function of a narrow band filter demodulator, magnetic storage core and integrating device. It should be apparent to one skilled in the art that in such a system means must be provided for isolating the effects of the readout process upon the filter networks. This is one of the critical phases of such a data retrieval system. In that system a transistor is utilized between the filter and the integrate drive winding of the magnetic core. The transistor in that instance serves both as an amplifier and as means to decouple the integrate drive winding from the filter during the readout of the core. The transistor also serves as an impedance transfer device since the filter is a low impedance source and the integrate drive winding on the core presents a high impedance. Prior to the instant invention it was believed that some device such as the transistor was absolutely essential in such a circuit utilizing progressive magnetic core memory devices having a plurality of stable magnetic states in order to provide isolation between the filter and the interrogate drive signal.

In accordance with the present invention it has been found that a square loop magnetic core, having a plurality of stable magnetic states between two stable saturation limits, when properly biased at a selected threshold level may be operated as a current driven device so that the integrate drive winding can be connected directly to the output of a channel filter which has an extremely low output impedance at the carrier frequency. Under this condition the core can perform envelope detection, that is, demodulation of the envelope and post-detection integration and serve also as a switch mechanism in an interrogate matrix, when the interrogate pulse is of selected frequency and width so that substantialy all of the energy of the pulse transformed by the core is well outside the bandpass of the channel filter.

An object of the invention is to provide a new and improved signal data retrieval apparatus.

Another object is to provide novel and improved magnetic core integration apparatus.

A further object is to provide a novel and improved circuit configuration for use in signal data retrieval apparatus for retrieving signal data from a wide spectrum of frequencies which are dispersed among noise signals or other undesired frequencies of random phase and amplitude.

A still further object is to provide a novel and improved signal data retrieval equipment utilizing as one of the main components a magnetic core element which serves simultaneously as a predetector and a post-detector integrator as well as a switching element in a data retrieval matrix.

A still further object is to provide a novel and improved signal data retrieval apparatus which is especially suited to circuit configurations for use in retrieving pulse Doppler signal data from the wide echo spectrum received by Doppler radar receivers.

Another object is to provide a novel and improved static memory device in a signal retrieval system which does not require power for the maintenance of the stored information.

The invention itself, however, both as to its organization and method of operation, as well as additional objects and advantages will best be understood from the following description when read in connection with the accompanying drawing, in which.

Figure 9:
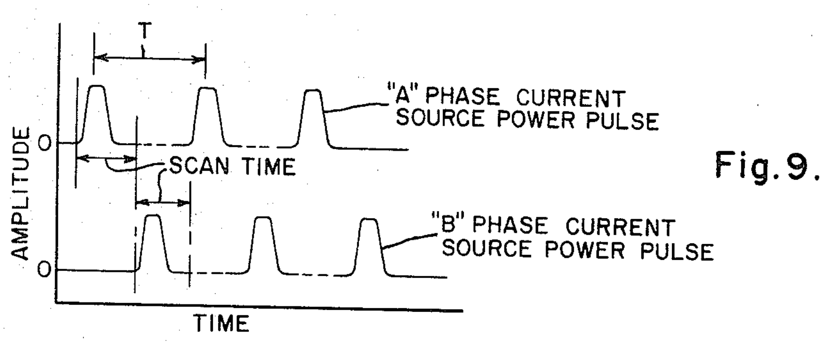
Figure 10:
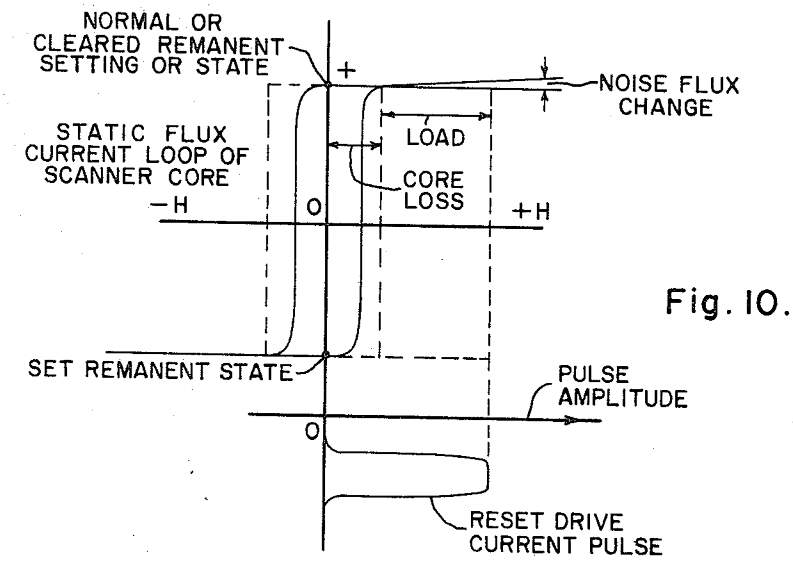

FIG. 9 includes a pair of graphs on the same time scale illustrating the time relationship of the two groups of pulses which are used in providing the sequential interrogation of the integrator cores of the data signal retrieval matrix; and FIG. 10 is a graph illustrating the magnetization characteristics of the scanner core devices in the manner in which the pulses cause scanning of the cores of the signal retrieval matrix in effecting interrogation process.

Figure 1:
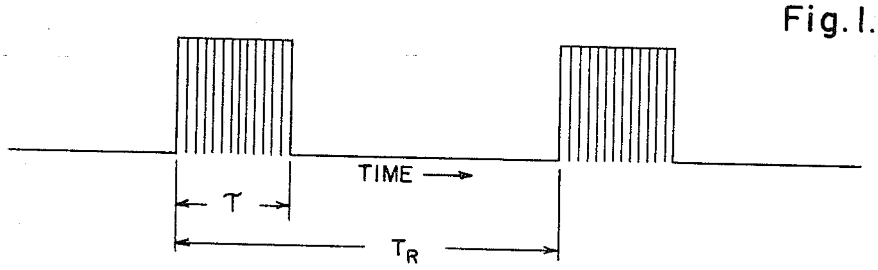
FIGURE 1 is a graph illustrating a train of radar frequency pulses, the modulation envelope being indicated by the rectangular shape pulses.
Figure 2:
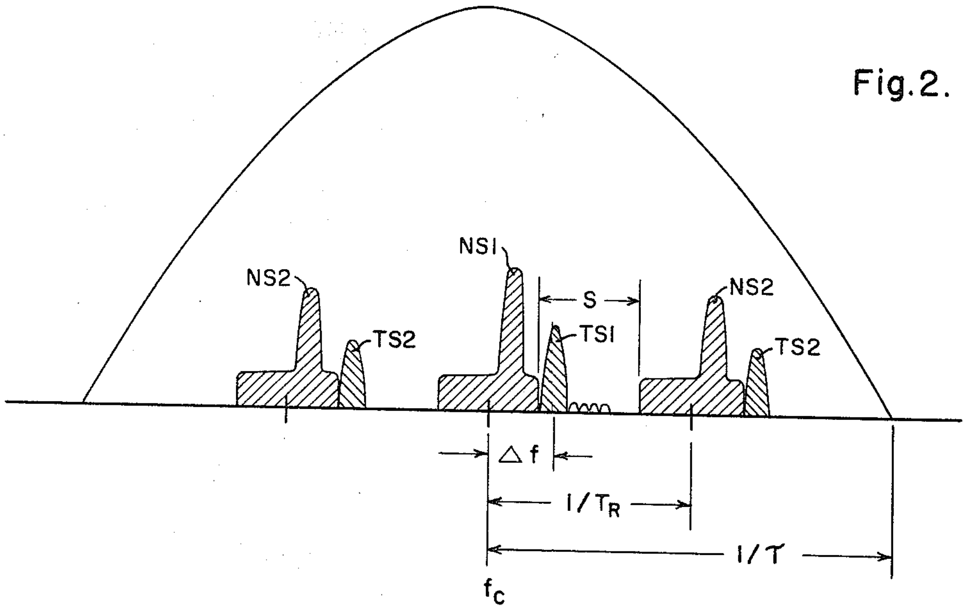
FIG. 2 is a graph representing the spectrum of frequencies transmitted by a pulse radio frequency signal indicated in FIGURE 1.

To facilitate an understanding of the present invention as applied to the retrieval of pulse Doppler radar signal data, a brief reference will be made to the nature of the signals involved. From Fourier analysis it is known that the so-called square wave, as illustrated by the two pulses in FIGURE 1, can be formed by the addition of periodic sinewaves different in frequency from each other by a frequency interval equal to $1/T_r$ where $T_r$ is the pulse repetition period. Of course, the square wave is never approached in practice but this analysis serves as a guide in designing equipment of this nature. The spectrum envelope of a transmitted pulsed radar signal is illustrated by the curve of FIG. 2 which is of the type sin $X/X$. The carrier frequency is represented as $f_c$ and harmonics of the carrier frequency $f_c$ will be spaced at a frequency interval equal to $1/T_r$. It is to be understood, of course, that when any carrier frequency is modulated there are always sum and difference frequencies so that the frequency distribution to the left-hand of the line indicating the carrier frequency $f_c$ would be similar to that to the right of this point. It is also well known by those skilled in the art that any additional frequency superimposed upon the modulation of a carrier merely superimposes additional frequency components and further corrupts or broadens the distribution of the desired signal data. This applies to noise at random frequencies and amplitudes as well as any other undesired signals. This has the effect of further burying the desired signal power further in the received signal spectrum.

In the case of pulsed Doppler radar, the Doppler phenomena shifts the transmitted carrier frequency spectrum, as indicated in FIG. 2 by the amount $\Delta f$. The Doppler phenomena effectively shifts the frequency components within the spectrum illustrated in FIG. 2, by an amount which is a function of the radial velocity between the source of the transmitted signal and the target scatterers.

Frequency $f_c$ is the carrier frequency. The Doppler shifted noise clutter spectrum is indicated at NS1 indicating the first harmonic. The second harmonic noise spectrum is indicated at NS2. The Doppler shifted target echo spectra are indicated at TS1 and TS2. The portion of the echo spectrum having Doppler signal data of significance and the most practical amplitude is indicated at S. In other words, as will be seen from subsequent description, the contiguous filters separate the portion of the spectrum indicated at S into separate discrete bandwidths to frequency quantize the signal-bearing spectrum. It will be obvious that the corresponding portion of the spectrum on the opposite side of the carrier frequency $f_c$ can be quantized likewise.

Basically, in accordance with the present invention, the received echo frequency spectrum is separated into discrete segments by means of filters having bandwidths commensurate with the desired range rate resolution. These bandpass filters perform the function of frequency quantization and pre-detection filtering. The basic target information in the pulse Doppler radar system is relative velocity, that is, range rate, and the signal supplied to the filters are fed from a number of range-gated receivers.

The group of freqnency detection channels is called the filter bank and interrogator unit, hereinafter referred to as FBI. Within each of these units are a plurality of contiguous frequency detection channels hereinafter referred to as FDC units, having demodulator, integration and readout means, the latter being responsive to periodic interrogation signals. The Doppler frequency is filtered, demodulated, and integrated in each channel. After a suitable integration time, the integrated information is sampled, and the amplitude of this value is subjected for a yes-no decision. The amplitude sampling occurs during the time interval during which the signal power in the FDC is being integrated and stored between readout intervals. The target detection decision for each channel is determined by a measurement of the integrated demodulated envelope of the frequency modulated signals appearing in the frequency quantized channels, the center frequency of which, so to speak, labels the frequency of the Doppler signal data.

The frequency detection channels form a portion of the velocity-range-gate matrix which accomplishes the quantization of the signal power in the respective channels. This matrix is sequentially interrogated and the integrated signal power, plus noise power in the individual channels is compared with a threshold reference for making the target detection decisions. Thus, each channel of the bank and interrogator unit quantiezs and detects the target Doppler signal data functionally by first, filtering (coherent integration), second, envelope detection and third, post-detection integration (non-coherent integration).

From a practical standpoint the clear region portion of the Doppler-shifted frequency echo spectrum is separated into the discrete segments by the aforementioned contiguous FDC's having bandwidths commensurate with the desired range rate resolution. The radar system characteristics, including target environment, determines the extent of the useful Doppler spectrum and the maximum permissable resolution. These requirements determine the number of filters necessary for range gated receiver, as well as the filter and pass shape. The bandpass of each filter also aids in the process of detection signal in random noise by reduction of the noise spectrum. This is what is meant by pre-detection filtering. The bandwidth of each FDC is inherently related to the available observation or integration time preceding a detection decision; this process has also been called coherent integration. The amplitude modulation of the shifted Doppler frequency in the channel is the function of the target range and the radar characteristic. The envelope demodulation of the shifted carrier permits examination of the amplitude characteristics to make a decision as to the presence of a target. This demodulation is what is termed the envelope detection previously mentioned. It can readily be seen that in order to obtain high resolution a very large number of filter channels would be necessary and therefore any improvement in the channels must be repeated several times. It is for that reason that the reduction of cost or complexity in any one of the channels results in a many fold reduction of cost or complexity of the overall system. It is to such a reduction in cost and complexity in one of these channels that the present invention is directed.

Figure 3:
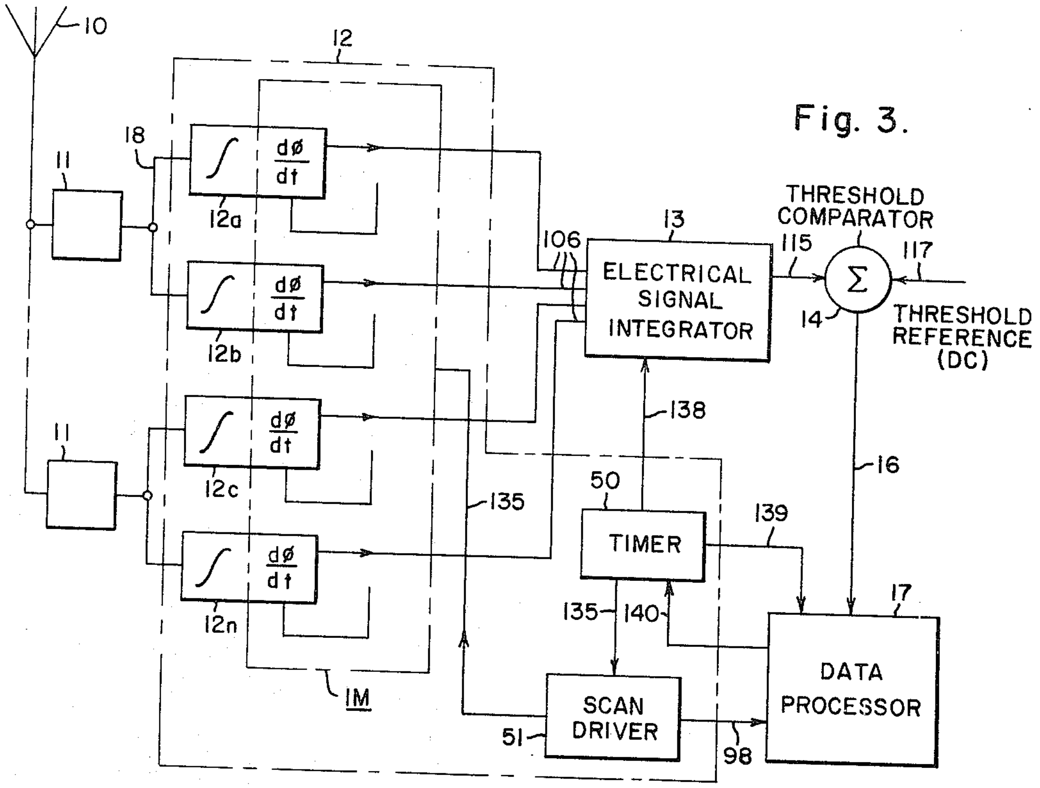
FIG. 3 is a schematic illustration of a pulse Doppler radar system utilizing the present invention.

The environment for an illustrative embodiment of the present invention is illustrated in FIG. 3 in connection with a Doppler radar system wherein a receiving antenna 10 may supply to a plurality of range-gated receivers 11 Doppler shifted echo signals. Then each of the receivers feed the outputs to the filter bank and interrogator (FBI) unit, symbolically indicated at 12. It is not necessary that there be more than one receiver. However, it is convenient in instrumenting the interrogator matrix when range gating is employed. Each of the receivers have their outputs supplied to a group of FDC's 12*a*, 12*b*, 12*c* . . . 12*n* of the FBI unit. The outputs from all of the FDC's are supplied to an electrical signal and interrogator unit 13 over leads collectively indicated at 106. The output of the latter unit is supplied over lead 115 to a threshold comparator 14 where the output of 13 is compared with a threshold voltage on lead 117 in accordance with practice well understood in the art. The latter is the decision making instrumentality of the system and the output of the threshold comparator 14 is supplied over conductor 16 to any conventional data processing unit 17. It has previously been indicated that the output from the various channels of the FBI unit 12 is a DC voltage and therefore the output from the threshold comparator 14 is the sum of these various voltages which can be digitized in the data processor 17, in accordance with conventional practice. As will appear from subsequent description in more detail a suitable timer 50 synchronizes the operation of the data processor 17, a scan driver 51 for the interrogator matrix IM of the FBI unit 12.

Figure 4:
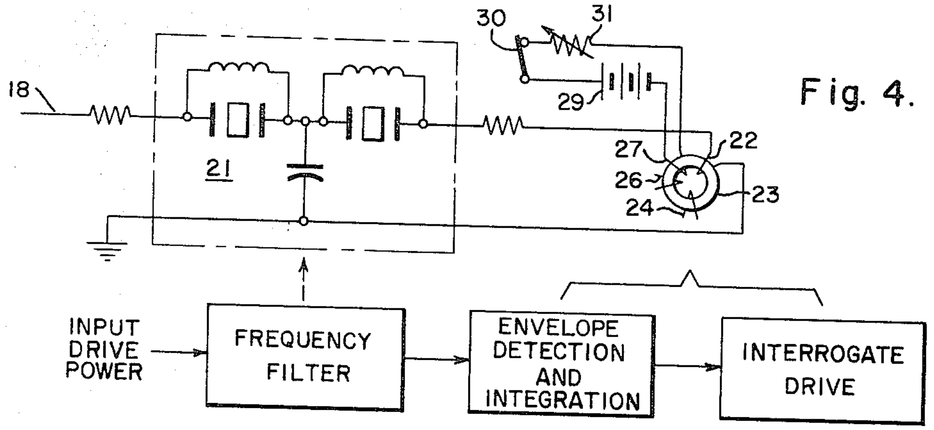
FIG. 4 is a schematic partial circuit diagram illustrating an individual channel in which the present invention is incorporated upon which is superimposed a flow chart indicating the operations performed on the signal by the components of individual channels.
Figure 5:
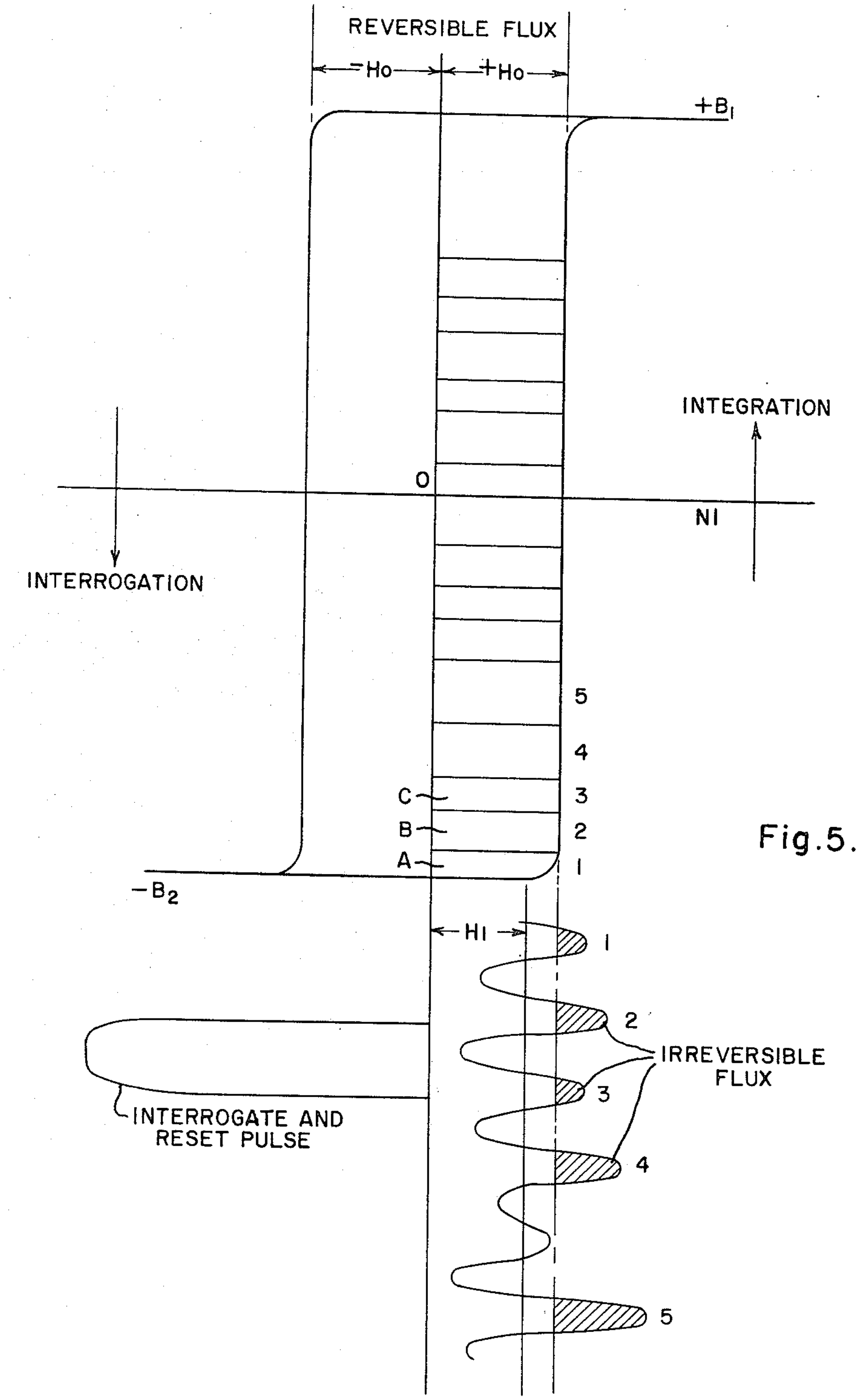
FIG. 5 is a diagram illustrating the magnetizing characteristics of a magnetic core in the manner in which the storage core functions in the circuit configurations in accordance with the present invention.

As previously indicated, the contiguous frequency detection channels 12*a* . . . 12*n* quantizes discrete portions of the Doppler echo spectrum. Since all of these filter detection channels are identical, except for their bandpass characteristics, it is necessary only to illustrate one of these channels in detail, which is indicated in FIG. 4 along with a flow diagram indicating the functions of the different components. In FIG. 4, the output of the individual receivers may be considered as a signal generator, symbolized at 18 connected to a two pole filter 21 of each FDC. The filter 21 is preferable of the crystal type of conventional construction and having a very high Q. The output of the filter 21 is connected to an integrate drive winding 22 of a magnetic core 23 of the type that is capable of assuming a plurality of stable magnetic states between two stable saturation limits. This core 20 has a square loop hysteresis characteristic that may be of the type known in the trade as Hipernik V. The flux current loop together with its method of operation is illustrated in FIG. 5, which will be best discussed in detail hereinafter. The core 23 is also provided with an interrogate drive and reset winding 24 and a sense winding 26. The three windings 22, 24 and 26 are more or less conventional in magnetic core devices employed in memory devices in computers and other types of matrices. In addition to these three windings the core 23 is also provided with an additional winding 27 which is adapted to be energized from a constant DC supply such as battery 29, through suitable control means such as a switch 30 and variable resistor 31, for the purpose of causing the core 23 to operate in a novel manner which is the salient feature of the present invention. When the winding 27 is suitably energized a unidirectional flux threshold is established in the core 23 causing it to operate as a demodulator while at the same time serving its other functions. For the purpose of clarity and continuity the significance of this winding will be described after a more complete picture of the complete system has been developed. At this point, however, further reference to FIG. 4 will indicate that the filter 21 quantizes the incoming Doppler frequency signals as to bandwidth while the cooperation of the winding 27, energized from a DC source to apply a unidirectional flux threshold to the core, with the integrate drive winding 22 constitutes a demodulator of the power spectrum envelope and at the same time integrates it and stores it during the time interval between interrogation pulses which are supplied to the interrogate winding 24 to readout the flux stored in the core as a representation of the signal power spectrum, of that channel.

As will be brought out from the subsequent description, not only does the core 23 serve as an envelope demodulator, integrator and storage unit but it also serves as a switch mechanism in the interrogator portion of the FBI unit 12. The function of the core as a switching unit in a matrix is not novel to this invention as this is taught in the aforementioned patent application. However, serving all of these functions, in addition to the further function of serving as an electrical decoupling unit when the core is biased by the bias winding 27, is the salient feature of the novel concept of this invention. This isolation is accomplished, as hereinafter pointed out in further detail, by so relating the pulse repetition frequency and the pulse width to the IF frequency of the radar receiver.

To facilitate the understanding of the role of the core 23 in the present invention it is appropriate to briefly review the mechanism of the theory of magnetism to see how it functions in the present instance, both as a demodulator of the Doppler frequency envelope, as well as an integrator and memory device. The square loop magnetic core 23 is used in this invention operates as a current driven device. Therefore the core does not function as a Faraday's law integrator since the input signal is a current rather than a voltage source. However, for a limited range of drive current amplitudes, current integration can be approximated by the mathematical expression, $$\Delta\phi = K\int(H - H_0)\,dt$$

where H is the applied magetizing force, which is proportional to the integrate drive current times the number of turns, and where $H_0$ is the internal threshold field within the core required for irreversible magnetization. The core 23 is a highly restricted ampere-second accumulator. Although the practical use of square loop cores, such as core 23, in this manner depends upon the control of measured properties and considerable care in combination with empirical judgment in the unit selection it is helpful to attempt to visualize the flux change process in terms of the domain theory.

A simplification of the nature of the accumulative current integrator core may be considered as an idealized single crystal of ferromagnetic material having a geometry providing a two-domain configuration. The magnetization within these two domains is antiparallel, creating a 180° domain wall. Since it has been previously shown that the velocity at which such a domain wall moves is proportional to the effective field perpendicular to the domain wall, it follows that the growth of one domain at the expense of the other is evidenced by a consequent change in flux. Also for appropriate geometries which is possessed by integrator cores, such as the core 23, the flux change is also proportional to the displacement of the wall. As a result, it will be apparent that such a device lends itself readily to being an integrator since the movement of the domain wall is the time integral of voltage appearing in in a sense winding. The displacement of the domain wall is proportional to the time integral of the effective H field which is proportional to the magnetizing field. In the present invention the magnetizing field is that due to the current output from the frequency detection channel. Therefore, the effective field which moves the domain wall and represents stored flux is that applied through the integrate drive winding 22 minus any bias flux $H_1$, indicated in FIG. 5.

Referring further to FIG. 5 there is a representation of the rectangular B–H magnetization curve for square loop material of the type of which cores 23 are made where the two stable magnetization saturation limits $+B_1$ and $-B_2$ indicate the limits of magnetization of the core 23 within which a plurality of stable magnetic states exist. Any flux between these two limits $-H_0$ and $+H_0$ is reversible by applying an external field while any flux outside of the limits will add to or subtract from the integrated flux inside the core. The bias voltage from battery 29 applied to the winding 27 maintains a constant unidirectional internal threshold represented at $H_1$ or any other desired level. It will be seen that any alternating magnetomotive force in the integrate winding 22 which has a magnitude greater than the coercive force threshold $H_0$ will cause the domain walls inside of the core to move toward the upper limit $B_1$ saturation and the amount that it moves in that direction will be an integral of ampere-seconds supplied to the integrate drive winding 22. These ampere-seconds are represented by the areas A, B, C, etc., indicated in FIG. 5. It will be apparent that as the amplitude of the integrate drive current produces a magnetizing force above the coercive force level $H_0$ will be added to the core by the positive loop but that the negative loop will not have any effect since it does not move in the opposite direction beyond the opposite coercive force level $-H_0$. Accordingly, the core serves as a demodulator as well as an integrator.

In the operation of the signal channels, at the center frequency of each filter the integrate drive source can be visualized as a voltage generator representing the output of one of the range-gated receivers shown in FIG. 3, being connected by lead 18 in series with the resonant impedance of the crystal filter 21 and the integrate drive winding 22. The Doppler signal target data desired resides within the effective amplitude modulation of the IF carrier of the receiver. This is a function of the range and size characteristics of the target and the addition of white Gaussian noise falling within the spectral band defined by the individual filters. The information in the FBI unit is retrieved in a two step process. In the first step the Doppler signal data is quantized in the FDC's. The second step of the process is the demodulation and storage of a magnetic flux representing the accumulative irreversible flux changes in the core produced by the signal power spectrum. At this point it is desired to emphasize that this storage process does not involve any energy, since it is in the form only of a magnetic flux. In the demodulation and storage process each cycle of the incoming carrier is subjected to the unidirectional threshold established by the internal field established in the core by the energized winding 27, as previously mentioned. Each cycle of the instantaneous carrier amplitude is integrated by the core for that portion of time in which it exceeds the coercive force threshold, such as $+H_0$ in FIG. 5, and the magnitude of each cyclic integration is remembered in an accumulative fashion as represented by the areas A, B, C, etc. Thus, the functions of envelope detection and post-detection integration are achieved by the magnetic core 23. The integrated information is stored as a magnetic state and ideally represents no energy storage and thus lends itself easily to high speed integration.

Figure 8:
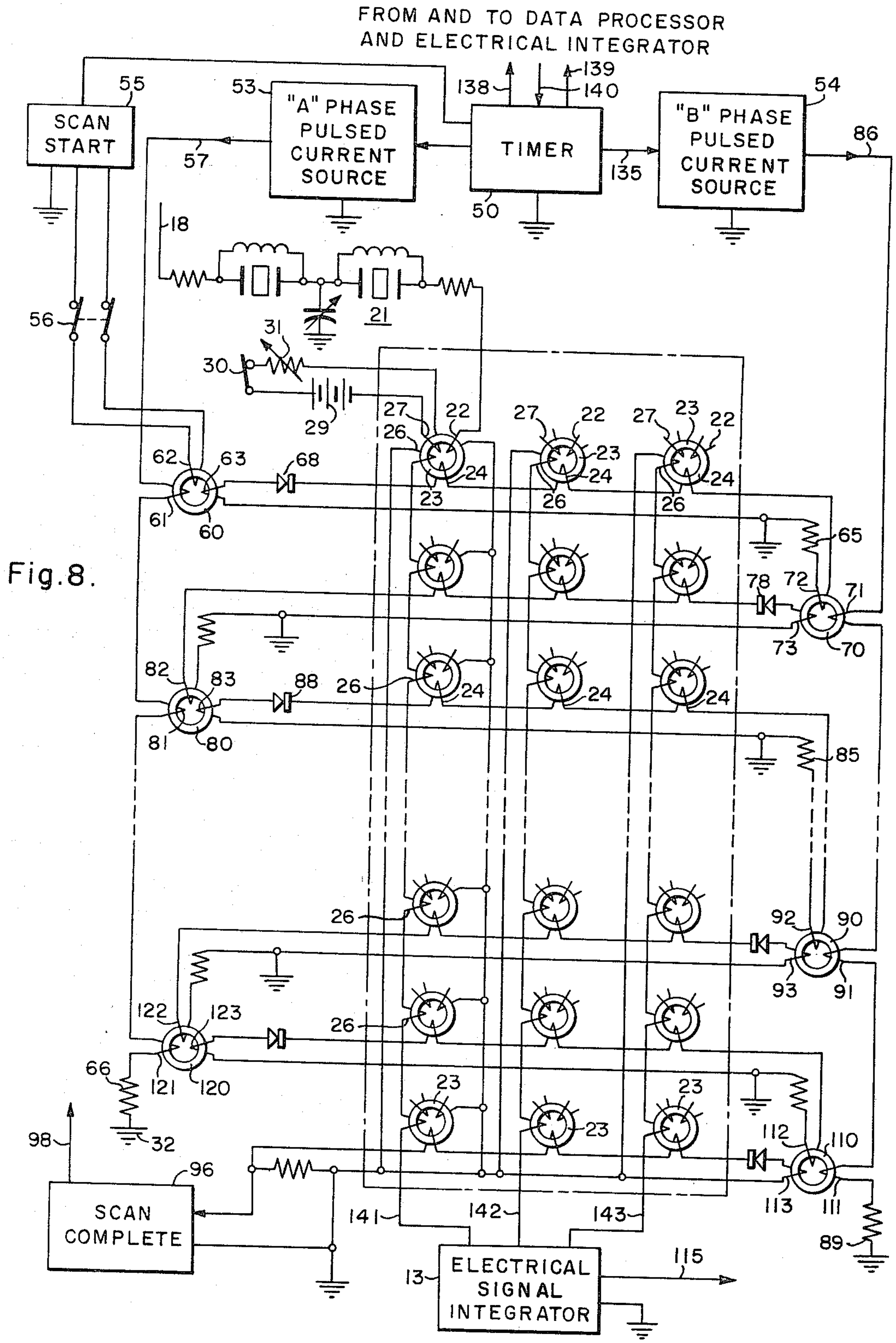
FIG. 8 is a schematic electrical circuit diagram of magnetic core storage integrators and the circuit of the magnetic core scanner system for sequentially interrogating the magnetic storage core integrators of the signal data retrieval system matrix.

To facilitate this high speed interrogation readout, all of the cores corresponding to the core 23 illustrated in FIG. 4 are arranged in the interrogation matrix configuration, IM as illustrated in FIG. 8, and the suitable appropriate timing means 50 and the peripheral components are provided for accepting the integrated information stored in the magnetic state, converting it in conventional manner to integrated electrical signals so that it can be further processed as desired by conventional binary digit equipment. The retrieval process that takes place in the matrix is merely a systematized and organized arrangement for energizing the interrogate drive windings 24 in the proper order and sequence to take advantage of the stored information represented by the accumulated magnetic states of the cores. The desired Doppler signal data is stored in the cores in what is commonly referred to as "irreversible" flux during the integration process. However, during the interrogation or readout process this so-called "irreversible" flux is reversed by an interrogate pulse of sufficient power so that it drives the magnetic core into its reset or zero position. During this reversal of flux, by transformer action, voltages will be developed, not only in the sense winding 26, but in the other windings, including the integrate drive winding 22. It is critical that substantially no electrical energy be returned by the winding 22 to the FDC's. Therefore, in order to achieve effective time sharing of the cores 23 for the functions of integration and interrogation, the integrate drive and integrate drive circuits must be effectively decoupled from each other, in some manner. Heretofore, in order to accomplish this decoupling a unilateral coupling device was interposed between the filter and the integrate drive winding as described in the aforementioned copending application. The elimination of the necessity of such a decoupling device in accordance with this invention is considered to be a substantial advance in this art. This is particularly true since with the prior devices there was an increase of several orders of magnitude, in the magnetomotive force required in the integrate drive as the frequency of the IF carrier was increased and depending upon the mode of drive. In accordance with this invention the DC bias magnetomotive force indicated at $H_1$ in FIG. 5 is set so that the instantaneous drive will never be significantly greater than the negative threshold $-H_0$ although it may be sometimes less than zero.

In accordance with this invention it has been found that the readout voltage can be prevented from entering the filter channels from the integrate drive winding during integration by adjusting the frequency and the pulse width of the interrogation drive so that the frequency spectrum of the pulses is well removed from the IF frequency of the radar receivers and the frequencies of the FDC's. This is explained in connection with FIGS. 6 and 7.

Figure 6:
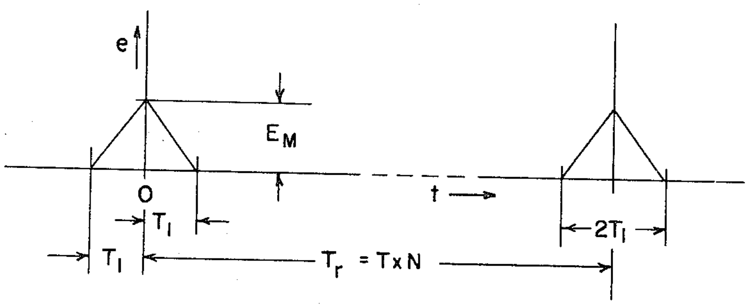
FIG. 6 is a graphical representation of the waveform of the voltage induced by the interrogate current pulse in the windings on the storage cores.

When the core 23 receives an integrate current pulse the resulting change of magnetization of the core from a magnetized storage state to a cleared, or zero reference state, causes an induced voltage to appear on all windings coupled to the core. This induced voltage represents the interrogation drive pulse energy transformed by the core and is a measure of the core flux information in time derivative form. The shape of this form has an appearance that can be approximated by a triangular wave, as indicated in FIG. 6, having a peak amplitude $E_m$, a base width $2T_1$ and a repetition time interval $T_r$. It has been found that it is desirable to keep the demagnetization current induced by this voltage to a minimum. A Fourier analysis of the triangular waveform of the interrogate pulses of FIG. 6 indicates that the amplitude of any of the harmonic can be described by:

$$C_n = 2E_{Avg}\left[\frac{\sin n\pi \frac{T_1}{2T_r}}{n\pi \frac{T_1}{2T_r}}\right]^2$$

Where $$E_{Avg} = \frac{E_m\ T_1}{2T_r}$$

Figure 7:
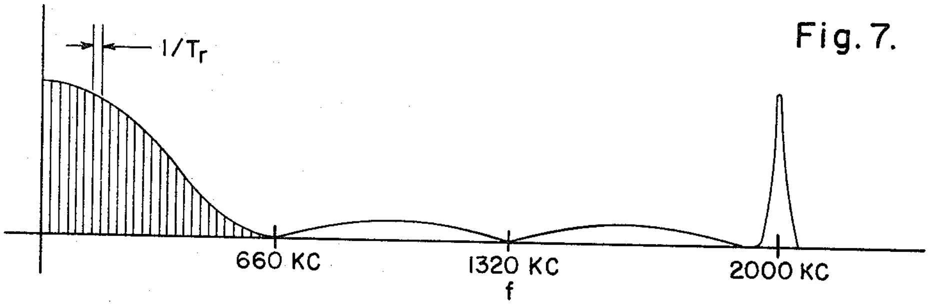
FIG. 7 is a graphical representation of the frequency distribution of the energy of the induced voltages represented in FIG. 6.

A plot of the envelope of the relative amplitudes of the harmonics as a function of frequency is shown in FIG. 7. Each vertical line represents the magnitude of a harmonic at a particular frequency compared to the magnitude at the fundamental frequency. The spacing between harmonics depends upon $T_r$, that is, the repetition time.

It is clear from FIG. 7 that most of the energy in this waveform exists in that part of the spectrum which is located well below $$f = \frac{1}{T_1}$$

(for example 660 kc.). Assuming that the IF carrier frequency of the radar receiver is approximately two megacycles, it will be seen from FIG. 7 that most of the energy in the interrogation pulse is substantially below 660 kilocycles. Therefore, when the FDC's 21 are designed to deliver signals limited to a very narrow band in the two megacycle region the lower frequency energy in the interogation drive pulse will be rejected by the filter and will produce negligible demagnetizing current. This shows that it is possible to drive a storage integrating core with a high frequency IF carrier integrate source which has extremely low output impedance at its rated frequency and that it will not be adversely affected by the lower frequency spectral energy contained in the integrate drive source if the interrogate pulse length and repetition frequency are properly selected. In the arrangement of this invention the integrate drive winding 22 serves as part of the resistive termination required for the filter without the danger of the interrogate drive pulse energy being coupled back into the filter channels.

The sequential scanning interrogator circuit for sequentially interrogating, or reading out, all of the detection and integration cores of a matrix, of which core 23 is representative, is illustrated in FIG. 8. In the illustrated embodiment there are three vertical rows of cores, all identical to core 23, and six horizontal rows of cores to form a 3 x 6 matrix. It should be understood, of course, that this is only illustrative and that the size of the matrix could be increased to fit the instrumentation of the radar receiver system in which the number of FDC's and/or range-gated received would be chosen in accordance with the desired resolution. It is clear from what has been said previously that there is only one core 23 for each FDC regardless of whether all of the channels are supplied from one receiver or whether the channels are distributed among several receivers. In any event the scanning of the cores is such that their stored Doppler signal data is read out sequentially from each core into the electrical integrator.

It will be seen from FIG. 8 that although the integrate drive winding 22 of each core is connected only to one of the respective filter channels, the interrogate drive windings 24 of the cores in horizontal rows connected in series in the scan drive circuit so that although an interrogate drive pulse is supplied to all the cores in one horizontal row simultaneously the only core in that row that will be readout will be the one which has just completed its integrate drive cycle. It is the timer 50 that synchronizes all of the operations. From the circuit diagram of FIG. 8 it will be apparent that the scan drive pulse across the matrix from one side to the other resets the scanner core on the opposite side so that when a scan drive pulse is supplied to the other scanner core its output pulse serves as the interrogate drive pulse for the cores in the next horizontal row and at the same time resets the scanner core on the other side of the matrix to produce the sequential scanning of the core matrix.

To this end, the data processor 17, shown in FIG. 3 is synchronized with the scan-driver 51 by the timer 50. The scan driver 51 includes an A phase current source 53 and a B phase current source 54 of FIG. 8, it being understood that the remaining portion of the scanner interrogator of FIG. 8 is shown symbolically at IM in FIG. 3.

The current sources 53 and 54 provide the A and B pulses having the time relation indicated in FIG. 9. It is not intended that these pulses are shown to true scale and it is to be understood that the time interval between the pulses of each phase as well as their pulse width is related to the resonant bandpass frequency of the filter channels as outlined in connection with the discussion of FIG. 6. In accordance with the previous discussion the time interval of both sets of pulses is $T_r$ times the number of channels, N.

Since the interrogator matrix IM, indicated symbolically in FIG. 3 and in more detail in FIG. 8, may be substantially identical with that of the aforementioned copending application Ser. No. 64,372 with the exception that in the present invention the cores are provided with the fixed biasing magnetic field, it is not believed necessary to duplicate all of the description appearing in that application.

Briefly outlining the interrogator matrix, the output of the A phase pulsed current source 53 is connected in a series circuit including winding 61 on scanner core 60, winding 81 on scanner core 80, winding 121 on scanner core 120 and resistor 66, the circuit being completed through ground 32. Similarly, the B phase pulsed current source 54 is connected in a series circuit including winding 71 on scanner core 70, winding 91 on scanner core 90, winding 111 on core 110 and a terminating resistor 89, the circuit being completed through ground 32.

All of the scanner cores are made of magnetic core material, such as Hipernik V, having a substantially rectangular loop as illustrated in FIG. 10. The amplitudes of the A and B phase pulses from the current drive sources 53 and 54, respectively, are more than sufficient to change, or switch, the flux in the scanner cores between a set remanent state of one polarity and a reset remanent state of the other polarity. Any excess of current not needed to switch the cores will be dissipated in the resistor 66 in the case of the scanner cores 60, 80 and 120 and in the resistor 89 in the case of the scanner cores 70, 90 and 110.

Each of the scanner cores 60, 70, 80, 90, 110 and 120 have, in addition to the scan drive windings 61, 71, 81, 91, 111 and 121, respectively, two additional windings each. They are 62 and 63 on core 60, 72 and 73 on core 70, 82 and 83 on core 80, 92 and 93 on core 90, 112 and 113 on core 110 and 122 and 123 on core 120. Winding 62 on core 60 is connected to a "scan start" driver 55 through a suitable double pole switch 56. The output pulse from "scan start" driver 55 initiates the scanning cycle for the interrogator matrix.

Winding 63 of core 60 is connected in a series circuit including the interrogate driving windings 24 of the storage cores 23 in the upper horizontal row, diode 68 resistor 65 and winding 72 of core 70. Preferably the side of the circuit on the side of the winding 63 opposite the diode and interrogator windings 24 is ground as indicated. Although the windings have previously been referred to as interrogate drive windings it should be clear that they serve also as reset windings as will appear from subsequent description. From the circuit diagram it is apparent that the interrogate drive pulses induced in winding 63 on core 60, in addition to interrogating the cores 23 in the upper row also resets the scanner core 70.

In a manner similar to the arrangement of the upper horizontal row of storage cores 23, the winding 73 on core 70 is connected in a series circuit including the interrogate drive windings 24 of the second horizontal row, a diode 78, resistor 75 and the winding 82 on scanner core 80. In similar fashion the winding 83 on core 80 is connected in a series circuit including diode 88, the interrogate drive windings 24 on the storage cores 23 in the third horizontal row, winding 92 on scanner core 90 and resistor 85. It is perhaps redundant to state the remainder of the interrogate matrix is connected in similar fashion so that the scanning cycle is completed when output pulse from winding 113 on core 110 interrogates the storage cores 23 in the bottom horizontal row and also triggers the "scan complete" driver 96 which supplies a control pulse conductor 98 to the data processor 17.

From FIG. 9 it is seen that the pulses from the A phase current driver 53 leads in time phase the pulses from the B phase current driver 54. The "scan start" driver 55 places the first scanner core 60 in the negative remanent state, assuming that the current pulses from driver 53 are positive prior to the initiation of the scanning cycle.

In the operation of the interrogator matrix circuit configuration of FIG. 8, the positive pulses from the drivers 53 and 54 puts all the scanner cores in positive remanence. The "scan start" driver 55 then sets the first scanner core 60 to the negative remanent state between the end of one scan cycle and the start of the next cycle. The first current pulse thereafter from driver 55 resets the scanner core 60 to positive remanence, inducing a voltage in winding 63. The current pulse in the high impedance winding 63 resets the storage cores 23 in upper horizontal row and sets the second scanner core 70 in its negative remanent state. In the process of resetting the storage cores 23 in the upper horizontal row, the cores are interrogated and the storage which has integrated flux stored in it representing radar signal data is read out and a corresponding pulse will be induced in its sense winding 26 and will be supplied over conductor 141 to the electrical signal integrator 13.

The next current pulse from B phase driver 54 resets scanner core 70 back to its positive remanent state inducing a voltage in its winding 73 which resets the storage cores 23 in the second horizontal row and sets scanner core 80 to its negative remanent state. The storage core in the second horizontal row, having stored flux therein will be read out in a manner similar to that described for the storage cores of the first horizontal row. The voltage induced in its sense winding 26 (the sense windings 26 of all cores 23 in the respective vertical rows are connected in series) will be supplied over conductor 142 to the electrical signal integrator 13.

The next, or second, current pulse from A phase driver 53 resets the scanner core 80 back to its positive remanence state in a manner similar to that in which the first A phase pulse acted on scanner core 60. This process continues in like fashion until the last scanner core 110 is switched.

The pluralities of the valve rectifier 68, 78 and etc. are chosen for proper circuit operation. The voltages induced in windings 72 and 82 (and those corresponding on the other scanner cores) are not effective to cause any significant current flow since the diodes in their circuits are so poled as to be back biased. When a scanner core or a storage core is set at positive remanence, the circuit pulse has negligible effect on it since it merely drives the core further into saturation. Thus, the only scanner cores which are effected by the current pulses from the respective A and B phase pulse curent source supplies are those which have been switched into a remanent state opposite to that which is produced by the pulses from the respective A or B phase current drivers.

The impedance in the sense circuit is designed such that the current flow due to the induced voltage in any one storage core 20 is below the static threshold value of the other storage cores.

The scanner can be stopped at any position of the control circuit which is a part of the radar system. This essentially provides a synchronous operation. The "scan complete" or "scan stop" circuit 96 informs it that the last position has been scanned. This can then stop the A and B phase pulse current sources from transmitting any additional pulses.

It is to be noted that in FIG. 8 the connections from timer 50 are slightly different from that illustrated in FIG. 3. This is because the leads to the "scan start" driver 55 and to the A and B phase current drivers 53 and 54, respectively, are collectively indicated by a single lead 135 in FIG. 3 whereas there are three separate leads in FIG. 8. The timer 50 is connected through leads 139 and 140 to the data processor 17 to supply control pulses to synchronize its operation with other components of the system including the range gates (not shown) for the various receivers or the several channels supplied by a single receiver. Lead 138 connects the time 50 with the electrical integrator 13 to control its pulsed output over lead 115 of conventional construction. The results of the comparison of the pulsed output from integrator 13 with a DC reference source (not shown), supplied over lead 117, is a pulsed signal voltage supplied over lead 16 to the data processor 17.

The arrangement of integrator cores 23 illustrated in FIG. 8 is to be considered an illustrative embodiment only and is not to be construed as a limit to the size of a matrix that can be provided. A much larger number of integrator cores may be employed, for example 600 may be employed to accommodate a receiver in which the echo spectrum of information-bearing significance is separated into 20 discrete segments with 20 channels. The 600 cores could be arranged in 20 vertical rows and 30 horizontal rows. Assuming, by way of example, a Doppler frequency shift from 14,000 to 20,000 cycles per second, each of 20 range-gated receivers, supplied from the same antenna, could supply an output to 30 bandpass filters each covering a band of 200 cycles. The left-hand scanner core in the upper horizontal row could be connected to the first FDC's covering 14,000 to 14,200 cycles; the right-hand core in the second horizontal row (read down) could be connected to the FDC's covering 14,200 to 14,400 cycles; the left-hand core in the third horizontal row could be connected to the FDC's covering 14,400 to 14,600 cycles, and etc.

The magnetic scanner illustrated in FIG. 8 is a high speed device consuming only a few microseconds per station. The operation of the scanner is not effected by the various flux levels in the storage cores 23. The scanner output has sufficient pulse power capability to switch all the storage cores in its circuit if necessary. If all of the switching power in the interrogation pulse is not needed to reset the cores the excess power will be dissipated in the resistors in this scanner core circuit. After the storage cores are reset to their cleared state they are then immediately available to begin again storing signal data information in the form of accumulated magnetic flux in the manner previously described.

The scanning function is performed by passive elements with their attendant advantages and reliability, stability, non-critical circuitry and economy. Since the cores 23, utilized in this system are quite small, the resulting unit is comparatively small in size and weight which is extremely important in the environment in which it is intended to be used.

All of the graphs are not to scale, the time interval T between interrogation pulses and their pulse widths on each storage core 23 must be in accordance with the previous discussion in connection with FIGS. 6 and 7 wherein it was indicated that most of the energy of the interrogation pulses was in a band much lower than the IF frequency of the radar receiver in order to provide the necessary isolation between the filter channels and the voltages induced in the integrate drive windings 22 of the storage cores 23. As a typical example, if the interrogation induced voltage pulse is approximately $3\times10^{-6}$ seconds in length and interval between pulses is $10\times10^{-3}$ seconds in a system where the IF radar frequency is two megacycles, there will be substantially no energy to enter the filter channels as a result of voltage pulses induced in the integrate drive windings 22, as a result of the interrogate pulses. This is clearly indicated in the graph of FIG. 7.

Whereas the invention has been shown and described with respect to an embodiment thereof which gives satisfactory results it should be understood that various changes and modifications may be made by those skilled in the art without departing from the spirit and scope of the invention.

What is claimed is:

1. Means for retrieving signal frequency data dispersed in a wide spectrum of frequencies including, non-coherent frequencies at random distribution and amplitude, said means comprising a plurality of signal channels adapted to be connected to a source of spectrum of frequencies including the desired signal power to be retrieved and each of said channels having selected bandwidths, the center frequency of which channels determines the center frequency of the desired signal power spectrum, said channels being substantially contiguous to embrace a desired band of frequencies having information-bearing significance, each of said channels having a magnetizable element having a plurality of stable magnetic states between two saturation stable limits of opposite polarities, first means for applying a constant magnetizing force to said element at a selected value less than the coercive force threshold of said element, second means for applying magnetizing forces to said element of sufficient magnitude to change the state of the magnetization from one limit of saturation toward the other limit of saturation by discrete pulses each being so limited in time duration that the element is magnetized from a state set by said first means to a plurality of successive stable states between said limits of saturation, and means for reversing the magnetization from that developed by the discrete pulses to the opposite saturation and means inductively associated with said magnetizable element for producing an electrical signal proportional to the state of magnetization created by said discrete pulses.

2. Signal data retrieval apparatus for retrieving signal frequency data dispersed in a wide spectrum of frequencies including non-coherent frequencies of random distribution and amplitude, said apparatus comprising in combination, a source of spectrum of frequencies including the desired signal power spectrum, a plurality of signal channels connected to said source and each having a selected bandwidth, the center frequency of the bandwidth of said channels determining the center frequency of the signal power spectrum of said channels, said channels being substantially contiguous so they separate the signal power of the spectrum into discrete segments and being contiguous to embrace a band of frequencies in said spectrum having information-bearing significance; each of said channels having magnetizable means for demodulating the envelope of the signal power spectrum, integrating and storing said signal power; said magnetizable means having a plurality of stable magnetic states between two stable saturation limits of opposite polarities, for applying a magnetizing force to said magnetizable means of sufficient magnitude to change the state of magnetization to a first stable limit of saturation, second means for applying magnetizing force in the opposite direction from said stable saturation limit but of magnitude less than the coercive threshold value so that a fixed magnetizing force less than threshold is maintained in said magnetizable means, third means for applying a magnetizing force to said magnetizable means of sufficient magnitude to change the state of magnetization from said first limit of saturation toward the other limit of saturation by discrete steps, said third means including a winding connected to said channel and inductively coupled to said magnetizable means, whereby each cycle of the signal power spectrum of frequencies in the channel above the coercive threshold is stored in said magnetizable means in the form of flux proportional to the magnitude and time interval during which it exceeds said threshold, the magnitude of each cyclic integration being remembered in an accumulative fashion in said magnetizable means, and fourth means responsive to the reversal of flux produced in said element by said first magnetizing means.

3. Signal data retrieval apparatus for retrieval of signal frequency data from a wide spectrum source of frequencies including non-coherent frequencies of random distribution and amplitude, said apparatus comprising a plurality of signal channels including filter means having a selected bandpass characteristic and each of said channels being connected to said source, said channels being substantially contiguous to embrace a desired band of frequencies having information-bearing significance each of said channels having means for demodulating the envelope of the signal power spectrum transmitted by the respective channels, said demodulating means being in the form of a magnetizable element having an integrate drive winding, an interrogate drive winding, a sense winding and a biasing winding to be energized to maintain a selected flux threshold at a level between the coercive threshold levels of said element, said integrate drive winding being connected to said filter means to store in said element flux changes in said element above the coercive threshold produced by output signals from the respective channel.

4. The combination set forth in claim 3 and magnetic core scanner means operatively connected to the plurality of magnetic storage elements for sequentially applying pulses to the interrogation windings to induce in the sense windings of the plurality of magnetizable storage elements electrical signals indicative of the stored flux levels of said elements.

No references cited.

KATHLEEN H. CLAFFY, *Primary Examiner.*

R. LINN, *Assistant Examiner.*